Figure 1:
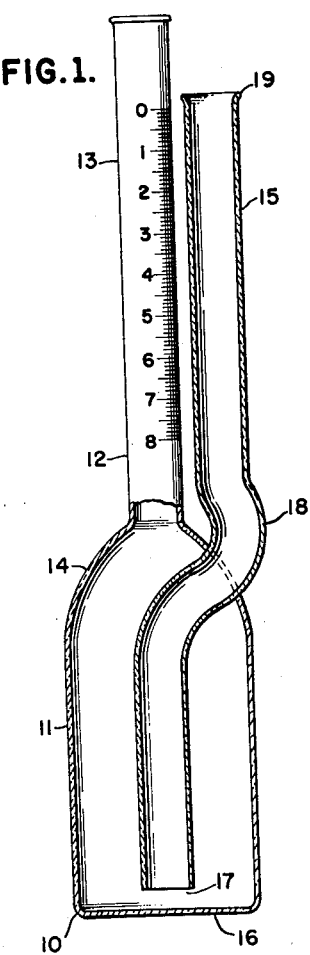

Jan. 22, 1963  B. B. ANDERSON ETAL  3,074,982
METHOD OF FAT EXTRACTION AND EXTRACTANT THEREFOR
Filed Feb. 19, 1959

INVENTORS
BAZEEL B. ANDERSON
J. C. ASH
D. W. BAILEY

BY

ATTORNEY 3,074,982
                              Patented Jan. 22, 1963

3,074,982
METHOD OF FAT EXTRACTION AND
EXTRACTANT THEREFOR
Bazeel B. Anderson, Duward W. Bailey, and James C. Ash, Fort Worth, Tex., assignors to Anderson Laboratories, Inc., a corporation
Filed Feb. 19, 1959, Ser. No. 794,273
19 Claims. (Cl. 260—412.8)

This invention relates to a method of extracting animal or vegetable fats or oils from the complexes in which they may be suspended or contained, and to the preferred type of apparatus usable therewith. This application is a continuation in part of application Serial Number 719,993, filed March 10, 1958, and now abandoned.

The fats, oils, and fatty materials to which this invention is directed include materials of either animal or vegetable origin containing fats, oils or fatty materials in the natural state, including for example, such materials as milk and milk products, meat and meat by products, such as tankage and meat scraps, soya and other beans, peanuts, cotton seed and many other oil or oil bearing seeds. It further includes such manufactured or processed products as evaporated or condensed milk, cheese, ice cream, and mixtures of animal or vegetable fats and oils such as frozen desserts, salad dressings, potato chips, fried corn meal products, and many other products of like kind. As to such products or materials it is frequently desirable to extract the fat or oil content, either to recover such content because of its commercial or scientific value, or the commercial or scientific value of the fat-free residue, or as a means of quantitatively or semi-quantitatively determining the percentage of the fat present.

As this invention is usuable with a wide variety of products containing different quantities and types of fat in different modes of mechanical inclusion, in practicing the invention, use is made of various novel compositions of matter, the ingredients of which may be varied as the circumstances of the particular task may require, in accordance with the teachings of this invention, to obtain the particular objective sought. These compositions of matter are frequently herein called "extractants."

The fact that surfactants may be used for the separation or segregation of fatty materials from the complexes or phases in which they may be found is known. The attempts to utilize surfactants for this purpose have not heretofore been wholly successful in such cases where, for example, it is desired to remove all of the fat content from a phase to determine what proportion of the phase it constitutes, or, conversely, to secure fat-free residue from a fat-non-fat complex.

Thus, a primary object of this invention is the provision of a novel method for securing the complete separation of fatty materials from a fat-non-fat complex on either a laboratory test basis, or in commercial residues from such complexes.

One of the specific activities to which this invention is directed is the testing of milk or milk products for fat content. The classical method for accomplishing this result is the so-called "ether extraction process," such as Rosese-Gottlieb or Majonnier. These are precise and effective, but have the marked disadvantage that each must be performed by competent laboratory technicians using delicate apparatus. The standard commercial methods heretofore used for such determinations, as the so-called "Babcock Test" and the Gerber method, have a like disadvantage in that technical skill is required to perform the test effectively, a dangerous acid is involved, and the results lack the precision of tests conducted by the ether extraction process. A further disadvantage of these standard commercial methods is that it is necessary to compensate the readings by using an additive to secure a correct reading. A further object of this invention is to provide a method for testing fat content which will permit of direct readings without utilizing compensators of any kind.

Attempts have been made to utilize surfactant materials as a substitute for the methods described. Such methods as have been employed heretofore have proved to be less reliable than the conventional Babcock test, in that the test results showed a tendency to give higher than average readings for milk of high fat content and lower than average readings where the milk product had a low fat content, or showed increasingly higher readings as fat content increased. One of the objects of this invention, then is to provide a test for the fat content of milk or milk products utilizing the peculiar properties of surfactants and approaching the ether extracting process in accuracy while obviating its disadvantages.

Some surfactant materials tested for this purpose have proved to have a short shelf life. Another object of this invention is to provide an extractant having a long shelf life.

Among the various factors that must be taken into account in the testing of milk products are the following:

(a) Quantitative fat content
(b) Composition of fat content
(c) Acidity of the test sample
(d) Protein variation
(e) Age of the test sample.

One of the objects of this invention is to provide a general purpose extractant usable in the testing of milk or milk products in the light of variations in each of the variables above enumerated. However, in the instance of certain variables, it has been found necessary to provide for variations in the steps of the process of testing, hereinafter more specifically to be described.

A further object of this invention is to provide a method, and apparatus usable therewith, to segregate the fat content of milk, to the end that anyone of ordinary skill interested in determining the fat content of milk may, by pusuing a simple set of instructions, in a relatively short period of time and with a simple apparatus, make accurate determinations of the fat content of as many samples of milk products as he desires, at regular intervals, and with a minimum of expense.

Surfactant materials operate as fat segregants in virtue of the fact that one portion of the molecule has hydrophylic characteristics and the other portion lipophylic or non-hydrophylic characteristics.

In the manipulation of the surfactants in accordance with this invention, we experience phenomena not heretofore observed or described in the literature. It therefore becomes necessary to define certain terms utilized herein. This we do as follows:

(a) By "negatively lipophylic" is meant that attribute of the surfactant, which permits it, at a certain stage of the environment, to tolerate fat without going into solution therein;

(b) By "negatively lipophobic" is meant that attribute of the surfactant which permits it, at a certain stage of the environment, to reject fat without, at the same time, embracing dominant hydrophylic characteristics.

We have discovered that these characteristics and the environment in which the surfactant functions can be controllably varied to perform useful work. To perform such work, it is necessary that at one stage in the process the surfactant be so activated that it will be preponderately hydrophylic; at a later stage negatively lipophylic, and at a still later stage, preponderately hydrophylic again. The inter-relation of the hydrophylic-lipophylic attributes of the surfactant is frequently referred to as the "hydrophylic-lipphylic balance," and abbreviated, for convenience, to HLB, as it will hereinafter be referred to.

A further object of this invention, then, is provision of means for controlling the HLB of surfactant materials to the end that during the negatively lipophylic stage all of the included fat will be separated by the surfactant from the phase in which it is contained and then, at a predetermined point, released by the surfactant for further physico-chemical manipulation in pursuance of the ultimate purpose sought, as for example, precise determination of the fat content of milk or milk products.

It has been found that in performing these operations of controllably varying the HLB of the surfactant, certain novel types of apparatus have special utility. A still further object of this invention is the provision of apparatus efficacious in performing these processes.

Figure 2:
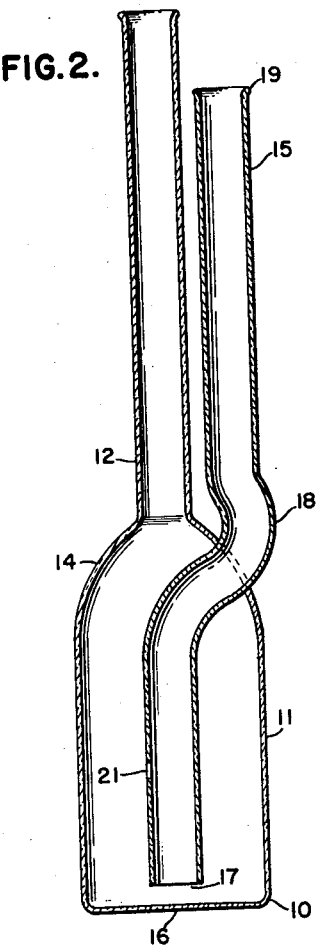
Figure 3:
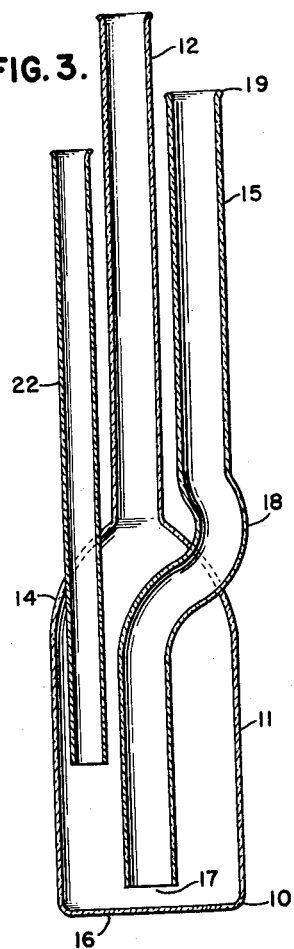
Figure 4:
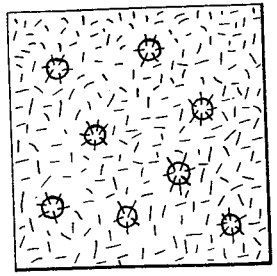
Figure 5:
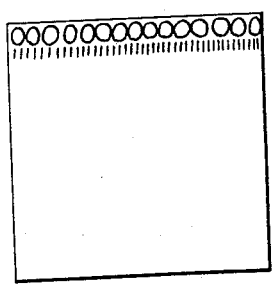
Figure 6:
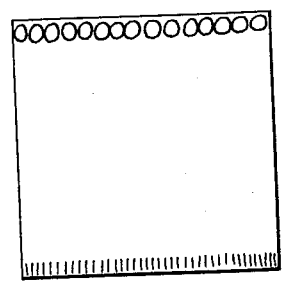

In the drawing, FIG. 1 is a sectional view of a type of container utilized in performing the optimum method of conducting the test where the fatty materials are processed from a liquid phase. FIG. 2 is a sectional view of an alternate type of container utilized in performing the optimum method where the fat to be extracted is contained in a solid phase. FIG. 3 is a sectional view of a variant of the type of container shown in FIG. 2, likewise used in processing fats contained in a solid phase. FIGS. 4, 5, and 6 are theoretical mechanism diagrams illustrating the physical and chemical events as they are thought to occur in the process.

It has been found in utilizing surfactants for the purposes described, that process will be facilitated through the cooperative inter-relationship of other reagents designed to supplement certain concurrent operations in connection with the mechanism performed by the surfactant. In the example of inclusion of fat in milk, milk is a colloid in which are dispersed globules of fat thought to be enveloped in a film of protein, perhaps as thin as one protein molecule in width. Since such film would interfere with the normal predilection of the negatively lipophylic portion of the surfactant for the fat, its removal becomes necessary and can be effected through the mechanism of a solubilizing or chelating agent. This solubilizing or chelating agent will operate to disperse or solubilize the protein film, or whatever the protective envelope may be, into the aqueous phase, rendering the fat globule accessable to the surfactant.

It has further been found that the chelating or solubilizing agent and the surfactant perform most effectively within a fixed pH range of between 7.5 and 9.5. For this reason, it has been found that the inclusion of a buffer agent to maintain the optimum pH within the range defined is desirable with certain mixtures.

Other reagents to control the reaction with the varying conditions that may be found to exist in the field, among which may be included milk products of an acidic nature, and milk products in which coagulation and agglutination has occurred, or will occur when the product is subjected to heat. Thus, the addition is dispersing agents has been found to be desirable in specific instances.

For the preferred surfactant, we have found that a nonionic surfactant composed of a polyoxyethylene ester of fatty and rosin acids more particularly described in Barker's Patent No. 2,559,583 of July 10, 1951, will perform effectively. We have found that mixtures of aliphatic and heterocyclic acid esters with 12 to 30 carbon atoms in the acide radical and at least 5, but preferably 10 or more, with an optimum valve of at least 16 oxyethylene groups per mol will serve the purpose. It has further been found that nonionic esters formed by the reaction of ethylene oxide with a long chain aliphatic alcohol, a typical example of which is polyoxyethylene tridecyl alcohol, with not less than 5 oxyethylene groups per mol, but preferably 10 or more with an optimum valve of at least 16 will perform satisfactorily.

We have further found that as a protein solubilizing or chelating agent the trisodium salt of ethylenediamine tetracetic acid $$[(HOOC-CH_2)_2-N-CH_2-CH_2-N(CH_2-COOH)_2]$$

customarily referred to as EDTA, and hereinafter so called is efficacious in the presence of a wetting agent, such as the surfactant herein described. EDTA and related materials are frequently referred to as "complexones."

In practice, the complexones EDTA and sodium carbonate are included separately as ingredients in the extractant composition. When these ingredients of the concentrate are dissolved in water to form the extractant solution, the EDTA and sodium carbonate react to give a sodium salt of EDTA at a pH of less than 9.5. This must be at least the disodium salt to react satisfactorily. There is no purpose in adding additional sodium carbonate to the composition to create the tetrasodium salt as this does not increase the efficacy of the solubilizing agent but does result in a pH at 9.5 or more, which is high enough to be slightly irritating to the skin of the user. At a pH of less than 7.5, EDTA forms the monosodium salt and the lowered pH has a tendency to decrease efficacy in the solubilization of the protein films. Where the materials to be tested or treated have excess acidity, such as certain tree saps, fermented peanut meal and souring milks, the monosodium salt will not perform satisfactorily even in the presence of a buffer agent, such as disodium phosphate. In order to stabilize the pH, we prefer to use dibasic sodium phosphate $[Na_2HPO_4]$.

It is thought the reagent EDTA also performs an additional function in respect of processing such liquids as milk in that it sequesters calcium ions. This should be of particular significance in sour milk or milk which might become sour during the extraction process in that the EDTA solubilizes the calcium caseinate [curd] in the fluid. We have also found that soluble salts of gluconic acid [e.g. sodium gluconate or potassium gluconate] may be substituted for EDTA.

We have found that in certain milks insoluble proteinlike materials interfere with precise fat extractions and these can be dispersed with urea $[NH_2-CO-NH_2]$.

Referring now to FIGS. 4, 5, and 6, it has been noted that the fat globules are thought to be contained in protein envelopes. In the first stage of the mechanism, the solubilizing agent in conjunction with the surfactant attacks the protein-fat complex to disperse the protein into the aqueous phase leaving the fat globules accessable to the surfactant. In this stage, shown conjecturally in FIG. 4, the surfactant is in solution in virtue of the predominance of its hydrophylic characteristics. This is depicted diagrammatically by the random orientation of a majority of the lines which represent the surfactant molecules. Nevertheless, a portion of the surfactant has begun to operate on the fat globules, shown by the circles, this aspect of the mechanism being depicted by the entry of the non-hydrophylic portion of the surfactant molecule toward the interior of the globule while the fat continues to be dispersed in the aqueous phase.

We now proceed to stage two in which the addition of heat accelerates the solubilization of the proteins and transfers the surfactant balance to predominant hydrophoby. These events plus the accessability of the fat globules to the negatively lipophylic portion of the surfactant molecule and the lower average specific gravity of the fat-surfactant complex permits the surfactant, by occulsion, to carry the fat globules upward through the aqueous phase to create a three-phase system, shown comjecturally in FIG. 5, in which we find a layer of fat at the top with a layer of surfactant interposed between the interfaces of the fat and aqueous phases. This operation in facilitated by the fact that the surfactant is negatively lipophobic and predominantly hydrophobic at this stage.

Proceeding to the third stage, depicted conjecturally in FIG. 6, the events are the addition of a diluent which changes the specific gravity of the aqueous phase, with concordant decrease in temperature, whereby the specific gravity of the surfactant phase becomes greater than that of the aqueous phase with the result that the surfactant phase falls to the bottom of the container. The events of stages two and three, as they have been described, may be observed visually in the performance of the process.

It should be understood that while stages one and two are described as separate events, they are in fact a continuum until the point of three phase separation at stage three is reached.

It should be further understood that while the various components of the extractant of this invention have been separately described and assigned specific functions, as these are understood, there nevertheless appears to be a cooperative relationship between them in operating on the broad spectrum of conditions that may be found in fat-non-fat complexes, the precise mechanism of which is presently not susceptible of exact explanation.

In laboratory operations, using the type of container illustrated in FIG. 1, the fat rises in the central tube and may be measured precisely against the graduations thereof.

A useful index for the HLB of the surfactant is the "cloud point." The cloud point for the entire preferred concentrated extractant, hereinafter described, is approximately 35° C. After proceeding through stages one through three, described above, the cloud point of the solution increases to approximately 55° to 60° C. within the bulb. It is important that the process as described should be conducted and the measurement of the fat content taken while the solution is maintained at all times at a state slightly less than or equal to 55° to 60° C., that is, the cloud point of the surfactant. Where the cloud point of the surfactant exceeds 55° to 60° C., the cloud point should be adjusted to the range required. Methods for effecting such an adjustment are well known, and include adding salts or other compounds to reduce the cloud point or adding alcohol or water to increase it.

A further factor of importance in the performance of the process is that the specific gravity of the surfactant must be higher than that of the aqueous phase as a whole, so that, as the mechanism in the process increases the hydrophylic characteristics of the surfactant, during the course of which the surfactant releases the fat, the surfactant will then drop to the bottom of the container. This is essential for the complete release of the fat to permit an exact measurement of the fat content. This aspect is not of significance in large scale extractive processes, but only where precise measurements are the desiderata.

SOLID STATE PROCEDURE

For separating fatty material from the solid state, in such commodities as peanuts, cotton seed meal, soya bean meal, meat and meat by products, such as tankage and meat scraps, a preferred extractant solution is shown in Table I as follows:

*Table I*

| | Parts |
|---|---|
| (a) Nonionic esters of commercial mixtures of tall oil acids and polyoxyethylene containing at least an average of 16 polyoxyethylene groups per mol | 3.0 to 6.5 |
| (b) Urea | 0.0 to 5.5 |
| (c) Dibasic sodium phosphate | 0.0 to 4.0 |
| (d) EDTA | 1.0 to 5.5 |
| (e) Sodium carbonate | 1.0 to 5.5 |
| (f) Water | Ca. 50.0 to ca. 120 |

The ingredients above enumerated, and those used for the liquid phase procedures, are compounded in the following manner:

The materials, other than water, in their normal state are in powdered or granular form, except the surfactant which is in the form of a viscous liquid. The granular materials are ground and screened, if necessary, through 16 to 18 mesh to the point where they are free flowing, when they are then intimately admixed. The surfactant is then added to the dry mix which is then mixed until it attains cake consistency when it is broken and screened through 8 mesh, then remixed, broken, and screened through 16 mesh. It is then ready for cure which takes place in from two to four weeks at room temperature. It may be considered cured when it has a dry free flowing appearance. It is ready then for use in the preparation of the solution. This is done by dissolving the requisite quantity in water. It goes readily into solution, apparently at first as a colloid which then dissolves by hydration. It must age for a minimum of six hours before it is ready for use as an extractant in the processes as described.

Before its solution in water, the dry mix has a long, relatively permanent shelf life as an effective extractant material.

EXAMPLE I

One pound of raw shelled peanuts was finely ground and digested at 100° C. with one pound of extractant solution for 10 minutes. The pure oil, amounting to 180 gms. was easily separated in a separatory funnel after cooling to 40° C. This amounted to 39.7 percent compared with 47.4 percent by ether extraction.

EXAMPLE II

The procedure of Example I, when applied to soya bean flour or ground bean, gave 22 percent of fat and oil compared to 21.9 percent obtained by ether extraction.

EXAMPLE III

The procedure of Example I, when applied to mustard flour after maceration of the flour with water for one hour at 60° C. gave 40 percent of mustard oil compared to 39.8 percent by ether extraction.

EXAMPLE IV

The procedure of Example I, when applied to cummin flour, after maceration gave 12.2 percent fat and oil compared to 12.4 percent by ether extraction.

The procedure of Example I gives equally excellent operation when applied to tankage, meat scraps, and the like.

While the foregoing descriptions cover laboratory tests, the process as described may be applied to substantial quantities of the materials to be treated, and it has been found that the various ingredients of the extractant, such as the surfactants, may be recovered by reheating to 100° C. and physically separated from the aqueous phase. The other components of the aqueous phase may also be recovered by well-known physical or chemical means.

LOW FAT CONTENT LIQUID PHASE PROCEDURE

The composition of the extractant found useful for quantitative testing of liquid phase test materials, such as milk or milk products, is shown in Table II as follows:

*Table II*

| | Parts |
|---|---|
| (a) Nonionic esters of commercial mixtures of tall oil acids and polyoxyethylene containing at least an average of 16 polyoxyethylene groups per mol | 3.0 to 6.5 |
| (b) Urea | 3.0 to 5.5 |
| (c) Dibasic sodium phosphate | 1.0 to 4.0 |
| (d) Solubilizing (chelating) agent | 1.0 to 5.5 |
| (e) Sodium carbonate | 1.0 to 5.5 |
| (f) Water | Ca. 50.0 to ca. 120 |

Mixing procedures are similar to those described for solid state extractant. For optimum performance, we have found that the proportion of the several ingredients should be: surfactant, 4 parts; urea, 3 parts; dibasic sodium phosphate, 1 part; EDTA, 2 parts; sodium carbonate, 3 parts; water, circa 70 parts.

EXAMPLE V

In performing a milk test, as a matter of convenience, there should be added to the extractant composition specified above 3 parts of methanol (commercial grade, full strength) to each 16 parts of extractant solution. The methanol serves as an agitator during the digesting operation. Then 17.6 ml. of milk are placed in a graduated test bottle, such as that shown in FIG. 1, and treated with 15 ml. of the extractant solution (including the methanol additive) described immediately above, and subjected to heat. The optimum condition is to heat the mixture at 100° C., for 8 to 10 minutes with occasional shaking during the first 5 to 7 minutes of the heating period. When lower temperatures are used, a longer heating period may be advisable. Then, from the side tube 15 of the bottle 10, FIG. 1, fill the bottle to within one-half inch of the top with water from the boiling bath and let stand for 5 minutes at room temperature. Then transfer the bottle to a tempering bath at 55° to 60° C., the bath being deep enough to cover the liquid level in the neck of the bottle. After 2 minutes of tempering, the bottle should be removed from the bath. The fat will have risen to form a top layer and the percentage of fat may be read from the bottom of the upper meniscus to the bottom of the lower meniscus of the fat layer, all as later described.

HIGH FAT CONTENT LIQUID PHASE PROCEDURE

A suitable extractant for testing cream and other liquid phase products of high fat content is shown in Table III as follows:

*Table III*

| | Parts |
|---|---|
| (a) Nonionic esters of commercial mixtures of tall oil acids and polyoxyethylene containing at least an average of 16 polyoxyethylene groups per mol | 4.0 to 6.5 |
| (b) Urea | 3.0 to 5.5 |
| (c) Dibasic sodium phosphate | 1.0 to 4.0 |
| (d) Solubilizing (chelating) agent | 2.0 to 5.5 |
| (e) Sodium carbonate | 3.0 to 5.5 |
| (f) Water | Ca. 70.0 to 120.0 |

Mixing procedures are similar to those described above for solid state extractant.

EXAMPLE VI

For testing a high fat content liquid, such as cream, add 9 gms. of cream to the bottle, such as that shown in FIG. 1, then add 9 ml. of water washing all of the sample into the bottle, then add 20 ml. of the extractant described in Table III and boil for 15 minutes with frequent swirling (8 to 10 times during the period) during the first 12 minutes. Then add hot water through the side tube of the bottle to bring the top of the fat layer into registry with the bottom of the neck and allow the bottle to remain in the boiling water bath for 3 additional minutes without further swirling or agitation.

Then remove the bottle from the bath, add hot water through the side tube of the bottle to bring the fat into registry with the top of the graduations in the neck. A few drops of 40 percent methanol should be added and then the bottle should be tempered for 5 minutes in a bath at 50° to 60° C.

We have further found that if the milk or cream is soured beyond normal testing possibility, the addition of 2 ml. of 10 percent citric acid solution to the milk or cream sample in the bottle, before adding the extractant, will condition the sample for testing in accordance with the procedure set forth in Example VI.

While the various components for the extractant described herein may be compounded in the laboratory, as a matter of convenience for work in the field, the several ingredients should be compounded to form a composition of matter generally usable for specific applications of a general type of fat containing materials. It has been shown that the percentage of these various components will vary in respect of the type of material to be treated, and since a general purpose compound is necessary to enable the user satisfactorily to process materials having random variations and characteristics, the general purpose extractant will thus function satisfactorily within reasonable variance limits for the specific material being subjected to treatment or test.

Referring now to the apparatus disclosed in FIG. 1, it comprises a container or bottle 10, and including a bulb portion 11 adapted to hold approximately 50 ml. of liquid. The bulb portion narrows at the top to form an extended neck portion 12 centered on the axis of the bulb, calibrated, as shown at 13, in tenths, half units and units from the numeral 8 at the bottom to zero at the top. Extending through the tapered portion 14 of the bulb 11 is a tube indicated generally by the numeral 15, entering the tapered portion of the side wall of the bulb and extending downwardly to a position coaxial with the extended neck 12 of the container, and terminating in a region spaced closely to the bottom 16 of the container as shown at 17. Exteriorly of the container the tube bends upon itself at 18 to assume a position of parallelity with the extended neck 12 of the container, but terminates at a point 19 below the top of the neck. The container of FIG. 1 is that used in connection with sample testing fatty materials included in a liquid phase, and the mode of use is presently to be described.

The container of FIG. 2 is used in connection with the processing of test material taken from the solid phase. It differs from the container of FIG. 1, the same reference numerals being used where applicable, only in that an orifice 21 is provided as shown in the tube 15 at a position within the container at approximately one-half the distance from the bottom 16 of the container to the point where the container begins its inward flare to form the neck portion, 12.

The container of FIG. 3 functions in a similar manner as that of FIG. 2 except that an additional side tube 22 is provided which terminates in the interior of the bulb portion 11 at a point about half way between the bottom 16 and the point of commencement of the tapered portion 14.

In using the container of FIG. 1, in a test, for example, of liquid milk for fat content, the operator will pipette 17.6 ml. (18 gms.) of milk sample into the tube 15 of the container, and will then add 15 ml. of extractant through the tube 15 by pipette, mixing with a swirling motion for a short time interval. The container will then be placed into a boiling water bath deep enough to cover the liquid level. When the boiling operation has been completed, the operator will then fill the tube 15 of the container with water from the bath to bring the liquid level in the container approximately to the point of zero calibration toward the top of the neck 12. When tempering has been completed, the level of the liquid in the neck can be brought exactly to the zero point on the scale by adding sufficient drops of water in the tube 15 or inserting a glass rod in the tube 15 to the point necessary to effect a precise coincidence.

In the container of FIG. 2, used for processing materials taken from the solid state, the procedure is in general the same. The sample to be tested should be ground to as small a mesh as possible in a mortar. When the sample has been prepared and the quantity to be tested weighed, it should be macerated thoroughly with small successive portions of extractant and then with water, holding the water to such volume that when the sample has been prepared the bulb 11 of the container will be not more than approximately four-fifths filled. The container with the test mixture is then placed in a boiling bath, for a protracted time interval, being shaken frequently, the precise interval depending to a considerable extent on the particular type of material being subjected to test.

The container should be removed from the bath, the side tube 15 filled with hot water, and the container centrifuged for 5 minutes. A few drops of 40 percent methanol should be added through the neck 12, the container centrifuged for 30 seconds and then tempered at 55° to 60° C. The fat content of the sample may then be read.

In testing fatty materials in the solid state, it has been found that frequently more than one operation, as described, is necessary for complete extraction of the fat. In such circumstance, it is desirable to remove as much as possible of the liquid phase between the fat layer and any solid materials lodged at the bottom of the container. This is done by applying a suction bulb at the top of the tube 15 of FIG. 2 or 22 of FIG. 3, as the case may be, and gently withdrawing as much of the aqueous phase as possible through the orifice 21 in the side of the tube 15 within the bulb 14, or through the tube 22. When as much of the liquid phase is removed as can be done without disturbing the fat layer and the solids, fresh extractant is then added through the tube 15 and heating, dilution, and centrifuging are repeated, as previously described.

It is obvious from the foregoing that we have provided a type of extractant, the required characteristics of which may be varied to conform to the specific requirements of each of the various classifications of materials to be handled, to the end that for test purposes, for example, an individual of ordinary skill, using the simple apparatus and procedures described, can perform fat extractions which may be precisely measured in a very short period of time and with a minimum of expense. Equally, where it is desirable to process materials for fat extraction in bulk for commercial purposes, the specific procedures herein described will satisfy such commercial requirements, and at the same time provide materials which can be recovered and reused, or recycled in the practice of the process.

Having fully described our invention, we claim:

1. An extractant comprising a composition of matter in a dry granular form, including a nonionic surfactant selected from the group of polyoxyethylene esters, having an average of 16 oxyethylene groups per mol. of tall oil acids, having from 12 to 30 carbon atoms in the chain, and urea, dibasic sodium phosphate, ethylenediaminetetraacetic acid, and sodium carbonate, the proportions of the several ingredients being as follows:
    a. Nonionic surfactant, 3.0 to 6.5 parts,
    b. Urea, 3.0 to 5.5 parts,
    c. Dibasic sodium phosphate, 1.0 to 4.0 parts,
    d. Ethylenediaminetetraacetic acid, 1.0 to 5.5 parts,
    e. Sodium carbonate, 1.0 to 5.5 parts.

2. A cured composition of matter in accordance with claim 1, in which the urea, dibasic sodium phosphate, ethylenediaminetetraacetic acid and sodium carbonate are ground and screened to the point where they are free flowing, to which mixture the nonionic surfactant is then added and mixed, and then permitted to stand until the mixture attains cake consistency, then is broken and screened, then remixed, broken and rescreened, then set for a period of two to four weeks at ambient temperature.

3. A composition of matter in accordance with claim 1, to which water has been added to form a seven to thirty-five percent solution.

4. A composition of matter prepared in accordance with claim 2, to which water has been added to form a seven to thirty-five percent solution.

5. That process for segregating the fat content of fat containing materials which includes the following steps: adding to a measured quantity of the material a measured quantity of fat extractant prepared in accordance with claim 3, heating the mixture to 100° C., and maintaining the mixture at that temperature for an interval of from eight to ten minutes, then adding a measured quantity of water to the mixture, and then tempering the mixture at a temperature of from 55° to 60° C. for an inerval of two minutes.

6. That process for segregating the fat content of fat containing materials which includes the following steps: adding to a measured quantity of the material a measured quantity of fat extractant prepared in accordance with claim 4, heating the mixture to 100° C., and maintaining the mixture at that temperature for an interval of from eight to ten minutes, then adding a measured quantity of water to the mixture, and then tempering the mixture at a temperature of from 55° to 60° C. for an interval of two minutes.

7. That process of determining the fat content of milk which includes the following steps: adding to 17.6 ml. of milk 15 ml. of an extractant prepared in accordance with claim 4, to which methanol (commercial grade, full strength) has been added in the proportion of 3 parts of methanol to 16 parts of extractant according to claim 4, heating the mixture for an interval of from eight to ten minutes at a temperature of 100° C., adding water to the mixture and then tempering the mixture for two minutes at 55° to 60° C.

8. An extractant comprising a composition of matter in a dry, granular form, including a nonionic surfactant selected from the group of polyoxyethylene esters, having an average of 16 oxyethylene groups per mol. of tall oil acids, having from 12 to 30 carbon atoms in the chain, and urea, dibasic sodium phosphate, ethylenediaminetetraacetic acid, and sodium carbonate, the proportions of the several ingredients being as follows:
    a. Nonionic surfactant, 4.0 to 6.5 parts,
    b. Urea, 3.0 to 5.5 parts,
    c. Dibasic sodium phosphate, 1.0 to 4.0 parts,
    d. Ethylenediaminetetraacetic acid, 2.0 to 5.5 parts,
    e. Sodium carbonate, 3.0 to 5.5 parts.

9. A cured composition of matter in accordance with claim 8, in which the urea, dibasic sodium phosphate, ethylenediaminetetraacetic acid and sodium carbonate are ground and screened to the point where they are free flowing, to which mixture the nonionic surfactant is then added and mixed and then permitted to stand until the mixture attains cake consistency, then is broken and screened, then remixed, broken and rescreened, then set for a period of two to four weeks at ambient temperature.

10. A composition of matter in accordance with claim 8, to which water has been added to form a ten to twenty-eight percent solution.

11. A composition of matter in accordance with claim 9 to which water has been added to form a ten to twenty-eight percent solution.

12. That process for segregating the fat content of fat containing materials having a high content of fat which includes the following steps: adding to a measured quantity of the material a measured quantity of water and thoroughly mixing the same, then adding a measured quantity of fat extractant prepared in accordance with claim 10, heating the mixture to 100° C., and maintaining the mixture at that temperature for an interval of fifteen minutes, with agitation during the first twelve minutes, then adding a measured quantity of water to the mixture and maintaining the mixture at 100° C. for a further three minutes without agitation, then adding a few drops of forty percent methanol and tempering the mixture at a temperature of from 55° to 60° C. for an interval of five minutes.

13. That process for segregating the fat content of fat containing materials having a high fat content which includes the following steps: adding to a measured quantity of the material a measured quantity of water and thoroughly mixing the same, then adding a measured quantity of fat extractant prepared in accordance with claim 11, heating the mixture to 100° C., and then maintaining the mixture at that temperature for an interval of fifteen minutes, with agitation during the first twelve minutes, then adding a measured quantity of water to the mixture and maintaining the mixture at 100° C. for a further three minutes without agitation, then adding a few drops of forty percent methanol and tempering the mixture at a temperature of from 55° to 60° C. for an interval of five minutes.

14. An extractant comprising a composition of matter in a dry, granular form, including a nonionic surfactant selected from the group of polyoxyethylene esters, having an average of 16 oxyethylene groups per mol. of tall oil acids, having from 12 to 30 carbon atoms in the chain, and urea, dibasic sodium phosphate, ethylenediaminetetraacetic acid, and sodium carbonate, the proportions of the several ingredients being as follows:
  a. Nonionic surfactant, 3.0 to 6.5 parts,
  b. Urea, 0.0 to 5.5 parts,
  c. Dibasic sodium phosphate, 0.0 to 4.0 parts,
  d. Ethylenediaminetetraacetic acid, 1.0 to 5.5 parts,
  e. Sodium carbonate, 1.0 to 5.5 parts.

15. A cured composition of matter in accordance with claim 14, in which the urea, dibasic sodium phosphate, ethylenediaminetetraacetic acid and sodium carbonate are ground and screened to the point where they are free flowing, to which mixture the nonionic surfactant is then added and mixed and then permitted to stand until the mixture attains a cake consistency, then is broken and screened, then remixed, broken and rescreened, then set for a period of two to four weeks at ambient temperature.

16. A composition of matter in accordance with claim 14, to which water has been added to form a four to thirty-five percent solution.

17. A composition of matter in accordance with claim 15, to which water has been added to form a four to thirty-five percent solution.

18. That process for segregating the fat content of fat containing solid materials which includes the following steps: adding to a measured quantity of the comminuted material a measure qauntity of fat extractant in accordance with claim 16, heating the mixture to 100° C., and maintaining the mixture at that temperature for an interval of ten minutes, then cooling the mixture to approximately 40° C.

19. That process for segregating the fat content of fat containing solid materials which includes the following steps: adding to a measured quantity of the comminuted material a measured quantity of fat extractant in accordance with claim 17, heating the mixture to 100° C., and maintaining the mixture at that temperature for an interval ten minutes, then cooling the mixture to approximately 40° C.

References Cited in the file of this patent
UNITED STATES PATENTS

| | | |
|---|---|---|
| 941,401 | Wynberg | Nov. 30, 1909 |
| 1,614,184 | Caccia | Jan. 11, 1927 |
| 2,014,823 | Tramm | Sept. 17, 1935 |
| 2,412,944 | Beersworth | Dec. 24, 1946 |
| 2,412,945 | Beersworth | Dec. 24, 1946 |
| 2,559,583 | Barker | July 10, 1951 |
| 2,773,889 | Kao | Dec. 11, 1956 |
| 2,863,734 | Schain | Dec. 9, 1958 |

OTHER REFERENCES

Schwartz et al.: "Surface Active Agents," Interscience Pub. Inc., N.Y., 1949, pp. 229 to 237 and pp. 477 and 478.